(12) United States Patent
Lin

(10) Patent No.: US 7,485,236 B2
(45) Date of Patent: Feb. 3, 2009

(54) INTERFERENCE DISPLAY CELL AND FABRICATION METHOD THEREOF

(75) Inventor: Wen-Jian Lin, Hsinchu (TW)

(73) Assignee: QUALCOMM MEMS Technologies, Inc., San Digeo, CA (US)

(*) Notice: Subject to any disclaimer, the term of this patent is extended or adjusted under 35 U.S.C. 154(b) by 247 days.

(21) Appl. No.: 11/221,806

(22) Filed: Sep. 9, 2005

(65) Prior Publication Data

US 2006/0006138 A1  Jan. 12, 2006

Related U.S. Application Data

(62) Division of application No. 10/807,129, filed on Mar. 24, 2004, now Pat. No. 7,193,768.

(30) Foreign Application Priority Data

Aug. 26, 2003  (TW) .............................. 92123498 A

(51) Int. Cl.
    *B44C 1/22*  (2006.01)
(52) U.S. Cl. .............................. 216/24; 216/41; 216/47; 216/49
(58) Field of Classification Search .................. None
    See application file for complete search history.

(56) References Cited

U.S. PATENT DOCUMENTS

| | | | |
|---|---|---|---|
| 3,616,312 A | 10/1971 | McGriff et al. |
| 4,392,711 A | 7/1983 | Moraw et al. |
| 4,617,608 A | 10/1986 | Blonder et al. |
| 4,859,060 A | 8/1989 | Kitagiri et al. |
| 4,900,136 A | 2/1990 | Goldburt et al. |
| 4,900,395 A | 2/1990 | Syverson et al. |
| 4,965,562 A | 10/1990 | Verhulst |
| 5,192,946 A | 3/1993 | Thompson et al. |
| 5,212,582 A | 5/1993 | Nelson |
| 5,293,272 A | 3/1994 | Jannson et al. |
| 5,330,617 A * | 7/1994 | Haond .......................... 216/13 |
| 5,347,377 A | 9/1994 | Revelli, Jr. et al. |
| 5,355,357 A | 10/1994 | Yamamori et al. |
| 5,358,601 A | 10/1994 | Cathey |
| 5,474,865 A | 12/1995 | Vasudev |
| 5,499,037 A | 3/1996 | Nakagawa et al. |
| 5,647,819 A | 7/1997 | Fujita et al. |
| 5,650,834 A | 7/1997 | Nakagawa et al. |
| 5,822,170 A | 10/1998 | Cabuz et al. |
| 5,824,608 A | 10/1998 | Gotoch et al. |
| 5,838,484 A | 11/1998 | Goosen et al. |
| 6,016,693 A | 1/2000 | Viani et al. |
| 6,057,903 A | 5/2000 | Colgan et al. |
| 6,158,156 A | 12/2000 | Patrick |

(Continued)

FOREIGN PATENT DOCUMENTS

CH      681047      12/1992

(Continued)

OTHER PUBLICATIONS

Austrian Search Report for EX72/2005 dated May 13, 2005.

(Continued)

*Primary Examiner*—Anita Alanko
(74) *Attorney, Agent, or Firm*—Knobbe, Martens, Olson & Bear, LLP

(57) ABSTRACT

An optical interference display unit with a first electrode, a second electrode and support structures located between the two electrodes is provided. The second electrode has at least a first material layer and a second material layer. At least one material layer of the two is made from conductive material and the second conductive layer is used as a mask while an etching process is performed to etch the first material layer to define the second electrode.

19 Claims, 4 Drawing Sheets

U.S. PATENT DOCUMENTS

| | | | |
|---|---|---|---|
| 6,166,422 | A | 12/2000 | Qian et al. |
| 6,194,323 | B1 * | 2/2001 | Downey et al. ............ 438/717 |
| 6,204,080 | B1 | 3/2001 | Hwang |
| 6,246,398 | B1 | 6/2001 | Koo |
| 6,249,039 | B1 | 6/2001 | Harvey et al. |
| 6,327,071 | B1 | 12/2001 | Kimura et al. |
| 6,329,297 | B1 | 12/2001 | Balish et al. |
| 6,335,831 | B2 | 1/2002 | Kowarz et al. |
| 6,391,675 | B1 | 5/2002 | Ehmke et al. |
| 6,392,781 | B1 | 5/2002 | Kim et al. |
| 6,522,801 | B1 | 2/2003 | Aksyuk et al. |
| 6,531,945 | B1 | 3/2003 | Ahn et al. |
| 6,537,427 | B1 | 3/2003 | Raina et al. |
| 6,577,785 | B1 | 6/2003 | Spahn et al. |
| 6,610,440 | B1 | 8/2003 | LaFollette et al. |
| 6,642,913 | B1 | 11/2003 | Kimura et al. |
| 6,674,563 | B2 | 1/2004 | Chui et al. |
| 6,768,097 | B1 | 7/2004 | Viktorovitch et al. |
| 6,867,896 | B2 | 3/2005 | Miles |
| 6,905,621 | B2 * | 6/2005 | Ho et al. ....................... 216/47 |
| 6,952,304 | B2 | 10/2005 | Mushika et al. |
| 6,980,350 | B2 | 12/2005 | Hung et al. |
| 6,982,820 | B2 | 1/2006 | Tsai |
| 6,995,890 | B2 | 2/2006 | Lin |
| 6,999,225 | B2 | 2/2006 | Lin |
| 6,999,236 | B2 | 2/2006 | Lin |
| 2001/0026951 | A1 | 10/2001 | Vergani et al. |
| 2002/0021485 | A1 | 2/2002 | Pilossof |
| 2002/0024711 | A1 | 2/2002 | Miles |
| 2002/0075555 | A1 | 6/2002 | Miles |
| 2002/0086455 | A1 | 7/2002 | Franosch et al. |
| 2002/0149828 | A1 | 10/2002 | Miles |
| 2003/0054588 | A1 | 3/2003 | Patel et al. |
| 2003/0201784 | A1 | 10/2003 | Potter |
| 2003/0231373 | A1 | 12/2003 | Kowarz et al. |
| 2004/0058531 | A1 | 3/2004 | Miles et al. |
| 2004/0087086 | A1 | 5/2004 | Lee |
| 2004/0125536 | A1 | 7/2004 | Arney et al. |
| 2004/0148009 | A1 | 7/2004 | Buzzard |
| 2004/0179445 | A1 | 9/2004 | Park |
| 2005/0195467 | A1 | 9/2005 | Kothari et al. |
| 2006/0066932 | A1 | 3/2006 | Chui |

FOREIGN PATENT DOCUMENTS

| | | |
|---|---|---|
| CN | 092109265 | 11/2003 |
| EP | 0173808 | 3/1986 |
| EP | 1258860 A1 | 11/2002 |
| JP | 10500224 | 1/1998 |
| JP | 10-148644 | 6/1998 |
| JP | 10-267658 | 10/1998 |
| JP | 11211999 A | 8/1999 |
| JP | 11243214 | 9/1999 |
| JP | 2000-40831 A | 2/2000 |
| JP | 2002-270575 | 9/2002 |
| JP | 2002-355800 | 12/2002 |
| JP | 2001-195189 | 9/2003 |
| JP | 2004-102022 A | 4/2004 |
| JP | 2004-212656 | 7/2004 |
| KR | 2002-9270 | 10/1999 |
| KR | 2000-0033006 | 6/2000 |
| TW | 157313 | 5/1991 |
| WO | WO 92/10925 | 6/1992 |
| WO | WO2006/036542 | 4/2002 |
| WO | WO 2005/085932 A | 9/2005 |
| WO | WO 2006/036385 | 4/2006 |
| WO | WO 2006/036437 | 4/2006 |

OTHER PUBLICATIONS

Austrian Search Report for EX81/2005 dated May 18, 2005.
Austrian Search Report for EX170/2005 dated Jul. 6, 2005.
Austrian Search Report for EX139/2005 dated Jul. 27, 2005.
Austrian Search Report for EX144/2005 dated Aug. 11, 2005.
Bains, "Digital Paper Display Technology Holds Promise For Portables," CommsDesign EE Times (2000), no month available.
Bass, Handbook of Optics, vol. 1, Fundamentals, Techniques, and Design, Second Edition, McGraw-Hill, inc. New York pp. 2.29/2.36 (1995), no month available.
Chu, et al. "Formation and Microstructures of Anodic Aluminoa Films from Aluminum Sputtered onglass Substrate" Journal of the Electrochemical Society, 149 (7) B321-B327 (2002), no month available.
Crouse, "Self-ordered pore structure of anodized aluminum on silicon and pattern transfer" Applied Physics Letters, vol. 76, No. 1, Jan. 3, 2000. pp. 49-51.
French, P.J. "Development of Surface Micromachining techniques compatable with on-chip electronics" Journal of Micromechanics and Microengineering vol. 6 No. 2, 197-211 XP 002360789 Jun. (1996) IOP Publishing.
Furneaux, et al. "The Formation of Controlled-porosity membranes from Anodically Oxidized Aluminium" Nature vo 337 Jan. 12, 1989, pp. 147-149.
Jerman J. H. et al., "Maniature Fabry-Perot Interferometers Micromachined in Silicon for use in Optical Fiber WDM Systems," Transducers. San Francisco, Jun. 24-27, 1991, Proceedings of the International Conference on Solid State Sensors Andactuators, New Youk IEEE, US, vol. Conf. 6, Jun. 24, 1991.
Lieberman, "MEMS Display Looks to Give PDAs Sharper Image," EE Times (Feb. 11, 1997).
Lieberman, "Microbridges at Heart of New MEMS Displays," EE Times (Apr. 24, 1997).
Maboudian, et al. Critical Review: Adhesion in Surface Micromechanical Structures: J. Vac. Sci Techno. B 15(1) Jan./Feb. 1997, pp. 1-20.
Microchem, LOR Lift-Off Resists Datasheet, 2002, no month available.
Miles, "Interferometric Modulation: MOEMS as an Enabling Technology for High-Performance Reflective Displays," Proceedings of the International Society for Optical Engineering, San Jose, CA, vol. 49085, pp. 131-139 (Jan. 28, 2003).
Miles, et al., "10.1: Digital Paper for Reflective Displays," 2002 SID International Symposium Digest of Technical Papers, Boston, MA, SID International Symposium Digest of Technical Papers, San Jose, CA, vol. 33 / 1, pp. 115-117 (May 21-23, 2002).
Penta Vacuum MEMS Etcher Specifications, http://www.pentavacuum.com/memes.htm, no date available.
Science and Technology, The Economist, pp. 89-90, (May 1999).
Search Report PCT/US05/030033 and Written Opinion, Dec. 30, 2005.
Search Report PCT/US05/030902, Jan. 26, 2006.
Search Report and Written Opinion for PCT/US05/33558 (May 19, 2005).
Search Report PCT/US05/032331 (Apr. 7, 2006).
Search Report PCT/US05/032331 (Jan. 9, 2006).
Search Report and written opinion PCT/US05/032647, Dec. 28, 2005.
Tayebi et al. "Reducing the Effects of adhesion and friction in microelectomechanical systesm (MEMS) through surface roughening: Comparision Between theory and experiments" http://jap.ajp.org/jap/copyright.isp Journal of applied Physics 98, 073528 (2005), no month available.
Thin Film Transistors- Materials and Processes -vol. 1 Amorphous Silicon Thin Film Transistors ed. Yue Kuo, Kluwer Academic Publishers, Boston (2004).
Xactix Xetch X Specifications, http://xactix.com/Xtech X3specs. htm. Jan. 5, 2005.
Xactix Xetch Product information, no date available.

* cited by examiner

INTERFERENCE DISPLAY CELL AND FABRICATION METHOD THEREOF

BACKGROUND

The present application is a divisional of U.S. patent application Ser. No. 10/807,129, filed on Mar. 24, 2004, now U.S. Pat. No. 7,193,768.

FIELD

The present invention relates to a method for manufacturing an optical interference display. More particularly, the present invention relates to a method for manufacturing an optical interference display with posts of arms.

DESCRIPTION OF THE RELATED TECHNOLOGY

Planar displays are popular for portable displays and displays with space limits because they are light and small in size. To date, planar displays in addition to liquid crystal displays (LCD), organic electro-luminescent displays (OLED), plasma display panels (PDP) and so on, as well as a mode of the optical interference display are of interest.

U.S. Pat. No. 5,835,255 discloses an array of display units of visible light that can be used in a planar display. Reference is made to FIG. 1, which depicts a top view of a light interference display unit disclosed in the prior art. A plurality of first electrodes 102 is located in parallel on a substrate 100. A plurality of the second electrodes 104 is located in parallel on the first electrodes 102 and is arranged vertically with the first electrodes 102. A plurality of posts 106 is located between the first electrode 102 and the second electrode 104, and a cavity (not shown) is subsequently formed. Reference is made to FIG. 2, which depicts a cross-sectional view according to a cutting plane line I-I' in FIG. 1. Every optical interference display unit 108 comprises two electrodes, 102 and 104. Posts 106 support these two electrodes 102 and 104, and a cavity 110 is subsequently formed. The distance between these two electrodes 102 and 104, that is, the length of the cavity 110, is D. One of the electrodes 102 and 104 is a semi-transmissible/semi-reflective layer with an absorption rate that partially absorbs visible light, and the other is a light reflective layer that is deformable when voltage is applied. When incident light passes through the electrode 102 or 104 and arrives in the cavity 110, in all visible light spectra, only visible light with wavelength corresponding to formula 1.1 can generate a constructive interference and can be emitted, that is, $$2D = N\lambda \qquad (1.1)$$

where N is a natural number.

When the length D of cavity 110 is equal to half the wavelength times any natural number, a constructive interference is generated and a sharp light wave is emitted. In the meantime, if the observer follows the direction of the incident light, a reflected light with wavelength $\lambda_1$ can be observed. Therefore, the display unit 108 is "on".

One of the first electrode 102 and the second electrode 104 is a deformable electrode or a movable electrode. It shifts up and down by applying a voltage. While driven by the voltage, the deformable or movable electrode is deformed and falls down towards another electrode due to the attraction of static electricity. At this time, the distance of the length of the cavity 110 changes. All incident light in the visible light spectrum is filtered out and an observer who follows the direction of the incident light cannot observe any reflected light in the visible light spectrum. The display unit 108 is now "off".

Referring again to FIG. 1, besides the post 106, support structure 112 is located between two second electrodes 104 to support the second electrode 104. Without the support structure 112, the edge of the second electrode 104 sags down due to a lack of support. Therefore, the length of the cavity 110 is not uniform. For the display unit 108, non-uniformity of the length of the cavity 110 results in reflected light with at least two different wave-lengths; therefore, the resolution of the reflected light becomes worse and the display unit may display more than one color.

Reference is made to FIG. 3A, which depicts a cross-sectional view according a cutting plane line II-II' in FIG. 1. The method for forming the structure illustrated in FIG. 3A is depicted in FIG. 3B. A transparent conductive layer, a absorption layer and a dielectric layer (all not shown) are formed sequentially on a transparent substrate 100. The transparent conductive layer, the absorption layer and the dielectric layer form a first electrode 102. A sacrificial layer 114 is then formed on the first electrode 102. The material for forming the dielectric layer comprises silicon oxide and silicon nitride; the material for forming the transparent conductive layer comprises indium tin oxide, indium zinc oxide and indium oxide; and the material for forming the absorption layer is metal. Next, a lithography process and an etching process are performed to form an opening 116 in the sacrificial layer 114 and the first electrode 102. A photoresist layer is spin-coated on the sacrificial layer 114 and fills the opening 116. An exposure process is performed on the photoresist layer and a support structure 112 is formed in the opening 116.

A conductive layer 118 is formed on the support structure 112 and sacrificial layer 114. A spin-coating process and a lithographic process are performed sequentially to form a patterned photoresist layer 120 on the conductive layer 118. An opening in the patterned photoresist layer 120 exposes the underlying conductive layer 118 located on the support structure 112. The patterned photoresist layer 120 is used as an etching mask to remove the exposed conductive layer 118; then, the second electrode 104 settled in parallel with the first electrode 102 illustrated in FIG. 1 is formed. Finally, the photoresist layer 120 is removed and the optical interference display unit 108 is formed.

Generally, a material used to form the support structure 112 is photoresist; therefore, the support structure 112 is always damaged or removed completely in the step of removing the photoresist layer 120 and a structure illustrated in FIG. 3C is formed. Reference is made to FIG. 3C, which depicts cross-sectional views of an optical interference display unit which lack the support structure. Because the support structure is damaged or removed, the edge of the second electrode 104 gets no support and sags in a direction indicated by arrow 105. The length of the cavity 110 is not uniform because of the sagging edge of the electrode 104. Therefore, the disadvantages of a worse resolution and wrong color of the optical interference display unit can't be avoided.

Therefore, it is an important subject to provide a simple method of manufacturing an optical interference display unit structure, for manufacturing a color optical interference display with high resolution, high brightness, simple process and high yield.

SUMMARY OF CERTAIN EMBODIMENTS

It is therefore an objective of the present invention to provide a method for manufacturing an optical interference display unit structure, which method is suitable for manufacturing a color optical interference display with high resolution.

It is another objective of the present invention to provide a method for manufacturing an optical interference display unit structure, which method is suitable for manufacturing an optical interference display with a simple and easy manufacturing process and high yield.

It is still another objective of the present invention to provide a method for manufacturing an optical interference display unit structure, which method is suitable for manufacturing optical interference display units where the support structure of the optical interference display unit is not damaged or removed in the process, and which is used to remove the photoresist layer and provide a high quality optical interference display plate.

In accordance with the foregoing objectives of the present invention, one preferred embodiment of the invention provides a method for manufacturing an optical interference display unit structure. The method for manufacturing an optical interference display unit structure disclosed in the present invention protects the support structure from damage or removal by the process, which is used to remove the photoresist layer on the second electrode. The method of fabricating the optical interference display unit structure is to form sequentially a first electrode and a sacrificial layer on a transparent substrate, and then form openings in the first electrode and the sacrificial layer. The openings are suitable for forming posts and support structure therein. Next, a photoresist layer is spin-coated on the sacrificial layer and fills the opening. A photolithographic process patterns the photoresist layer to define a post and the support structure.

At least one first material layer is formed on the sacrificial layer, the post and the support structure after the post and the support structure is formed. A second material layer is then formed on the first material layer. A patterned photoresist layer, which is used as a mask for the next etching process, is formed on the second material layer. An etching process is performed to remove the exposed second material layer and expose a portion of the first material layer and the pattern of the photoresist layer is transferred to the second material layer. The photoresist layer is stripped and the second material layer is used as an etching mask to etch the first material layer to define the second electrode. While stripping the photoresist layer, the support structure is covered and protected by the first material layer, and the support structure is not damaged or removed by the process. Finally, a release etch process is performed to remove the sacrificial layer and an optical interference display unit structure is formed.

The material for forming the second material layer can be any material, capable of transferring the pattern of the photoresist layer thereon and an etch mask while the process for etching the first material layer is performed. Because the second electrode is a deformable electrode or a movable electrode, the preferred material for forming the second material layer is a ductile material, such as metal.

The material for forming the first material layer and the second material layer can be the same, but different is better. Furthermore, if the etching selectivity ratio between the first material layer and the second material layer is not high enough, the second material layer is etched when the etching process to the first material layer is performed, and the thickness of the second material layer becomes thinner than originally intended. The thickness of the second electrode (including the thickness of the second material layer) affects the stress of the second electrode and the operative voltage of the optical interference display unit. How much voltage should be used to operate the optical interference display unit if the thickness of the second material layer after etching process is altered is not known. For the reason disclosed above, the preferred material for forming the second material layer has a high etching selectivity ratio compared to the material for forming the first material layer.

In accordance with the method for manufacturing an optical interference display unit structure in present invention, at least two material layers are used to form the second electrode. The material layer located on the upper position (for example, second material layer) is used to transfer the pattern of the photoresist layer thereon and the other material layers (for example, at least one first material layer) are used to protect the support structure from damage in the process for stripping the patterned photoresist layer. Concurrently, an optical interference display plate with high quality is produced. Therefore, the present invention discloses a method for manufacturing an optical interference display with a simple and easy manufacturing process and high yield.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will be more fully understood by reading the following detailed description of the preferred embodiment, with reference made to the accompanying drawings as follows.

DETAILED DESCRIPTION OF THE PREFERRED EMBODIMENT

In order to provide more information of the optical interference display unit structure, the preferred embodiment is provided herein to explain the optical interference display unit structure in this invention.

Embodiment

Figure 1:
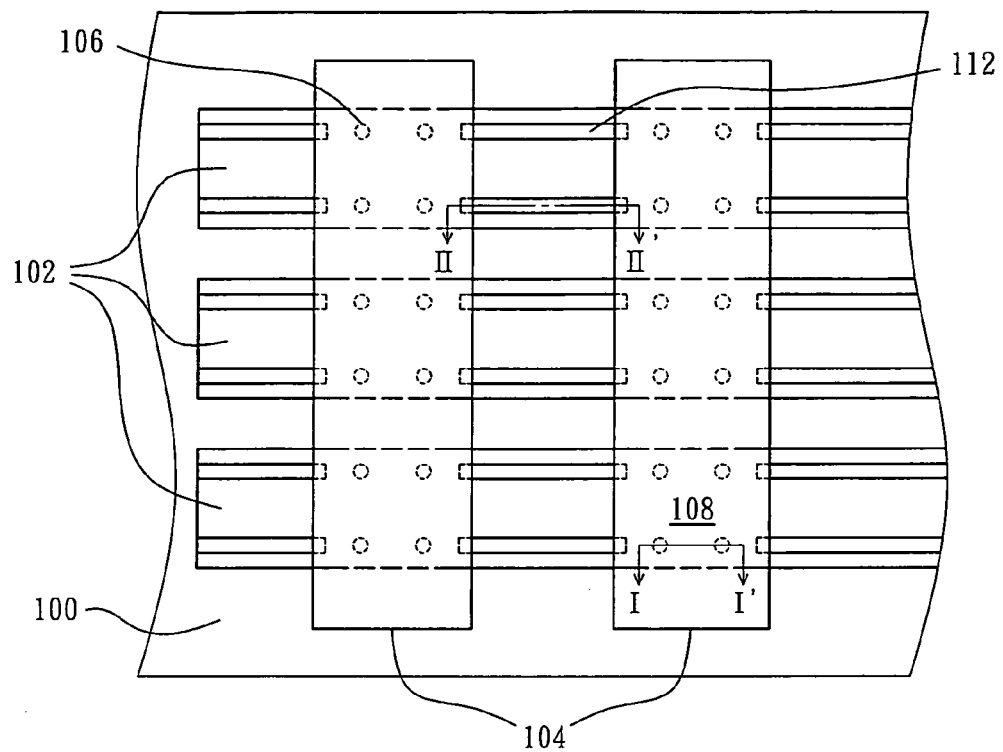
FIG. 1 depicts a top view of a light interference display unit disclosed in the prior art.
Figure 2:
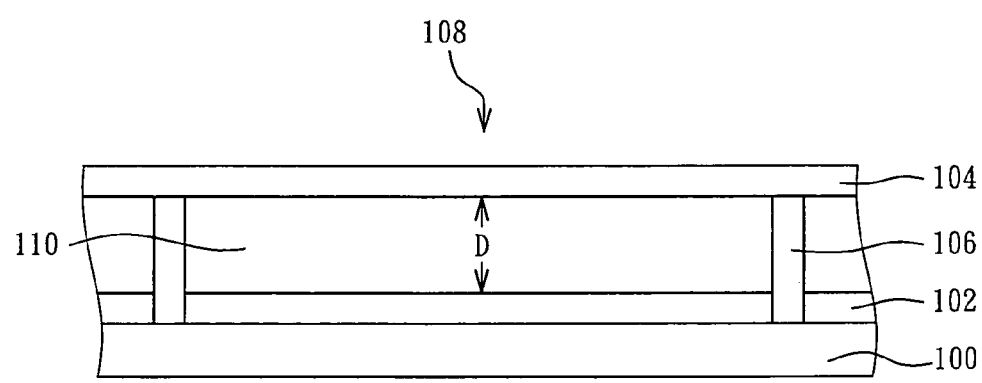
FIG. 2 depicts a cross-sectional view according to a cutting plane line I-I' illustrated in the FIG. 1.
Figure 3A:
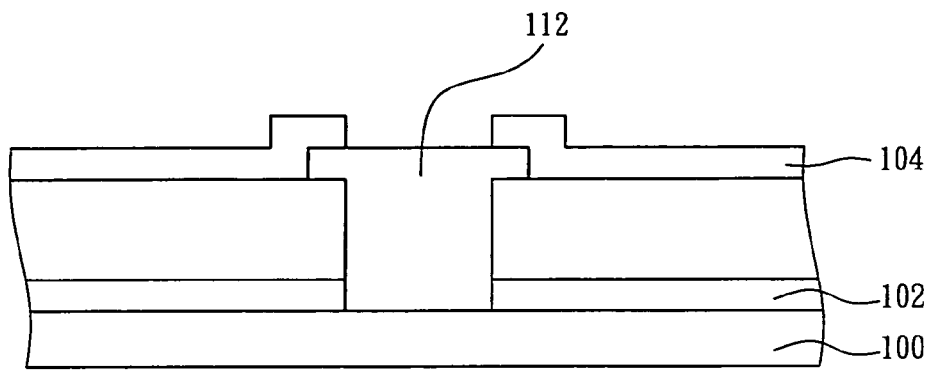
FIG. 3A depicts a cross-sectional view according to a cutting plane line II-II' illustrated in the FIG. 1.
Figure 3B:
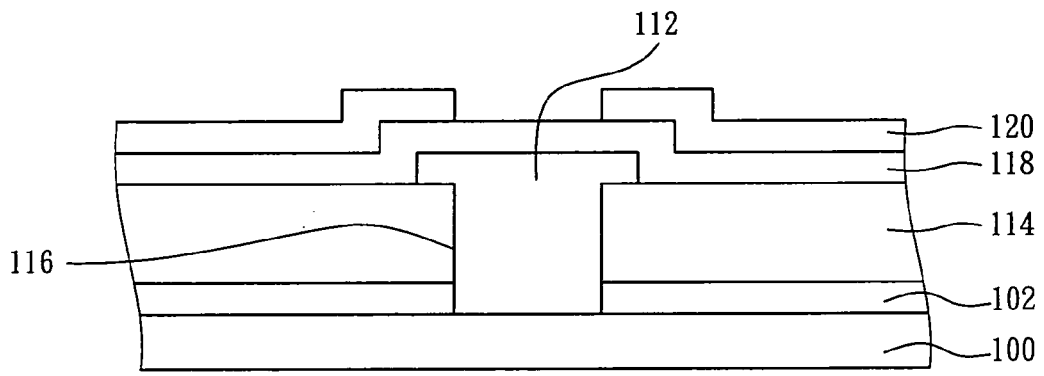
FIG. 3B depicts a method for forming the structure illustrated in FIG. 3A.
Figure 3C:
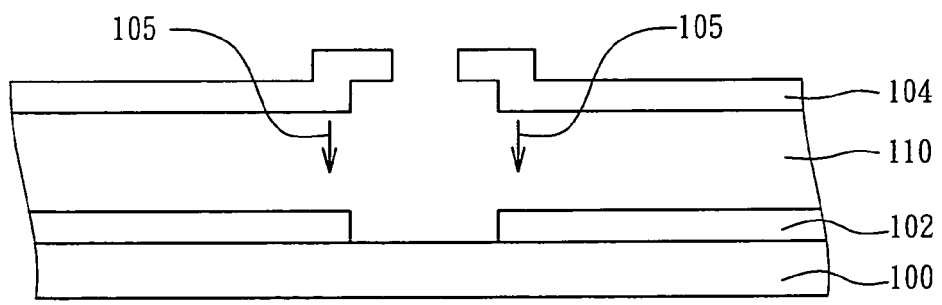
FIG. 3C depicts cross-sectional views of an optical interference display unit, which lacks of the support structure.
Figure 4A:
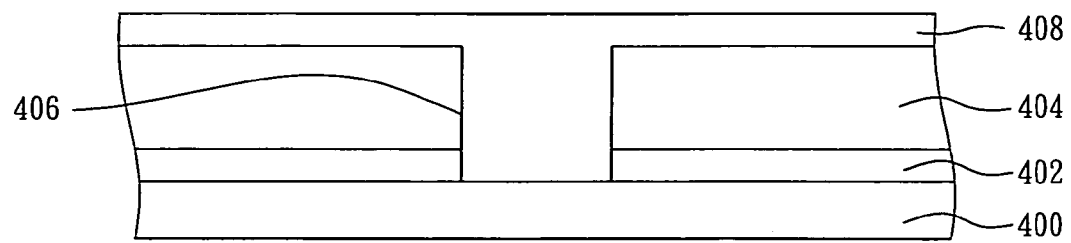
FIGS. 4A to 4D depict a method for manufacturing an optical interference display unit according to one preferred embodiment of this invention.

FIGS. 4A to 4D depict a method for manufacturing an optical interference display unit according to a preferred embodiment of the invention. Reference is made to FIG. 4A first, in which a first electrode 402 and a sacrificial layer 404 are formed in order on a transparent substrate 400. The sacrificial layer 404 is made of transparent materials such as dielectric materials, or opaque materials such as metal materials. Opening 406 is formed in the first electrode 402 and the sacrificial layer 404 by a photolithographic etching process. The opening 406 is suitable for forming a support structure therein. The transparent substrate 400 is, for example, a glass substrate and the first electrode 402 comprises at least one conductive transparent material layer. The conductive transparent material is indium tin oxide (ITO), indium zinc oxide (IZO), or indium oxide (IO).

Next, a material layer 408 is formed on the sacrificial layer 404 and fills the opening 406. The material layer 408 is suitable for forming support structures and posts, and the material layer 408 generally uses photosensitive materials such as photoresists, or non-photosensitive polymer materials such as polyester, polyamide or the like. If non-photosensitive materials are used for forming the material layer 408, a photolithographic etch process is required to define support structures and posts in the material layer 408. In this embodiment, the photosensitive materials are used for forming the material layer 408, so merely a photolithographic etching process is required for patterning the material layer 408.

Figure 4B:
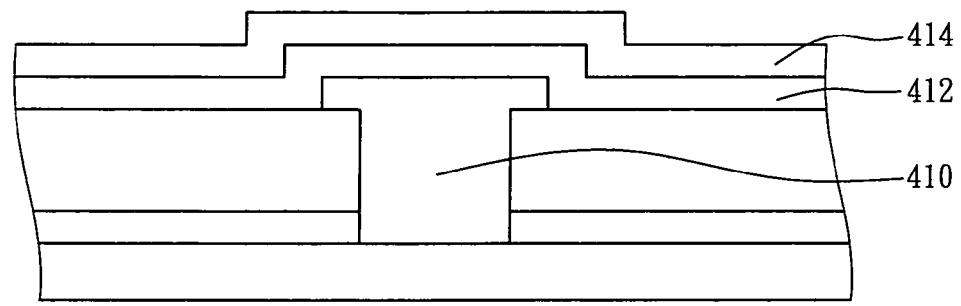

Reference is made to FIG. 4B, in which the support structure 410 and posts (not shown in the scheme) are defined by patterning the material layer 408 during a photolithographic process. After this step, a second material layer 412 and a third material layer 414 are formed sequentially on the sacrificial layer 404 and support structure 410. The second material layer 412 and the third material layer 414 are adapted to form a second electrode; therefore, the material of at least one of the second material layer 412 and the third material layer 414 is a conductive material, such as, for example, aluminum, chromium, copper, or cobalt. The material for forming the other material layer of the second material layer 412 or the third material layer 414 is metal or dielectric, such as, for example, aluminum, chromium, copper, cobalt, silicon nitride or silicon oxide. The materials for forming the second material layer 412 and the third material layer 414 are aluminum and chromium, respectively. Furthermore, the material for forming the second material layer 412 and the third material layer 414 are chromium and aluminum, respectively.

Figure 4C:
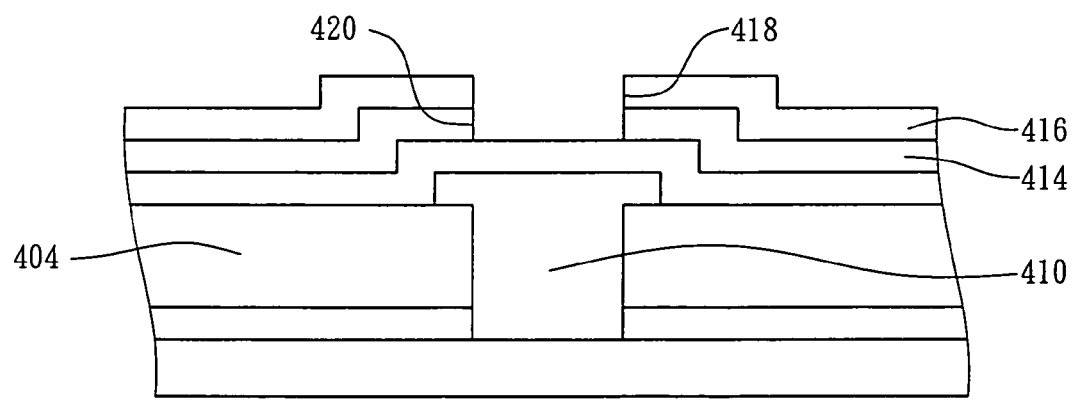

Reference is next made to FIG. 4C. A patterned photoresist layer 416 is formed on the third material layer 414. The patterned photoresist layer 416 has an opening 418, which is located upon the support structure 410. The patterned photoresist layer 416 is used as an etching mask and an etching process is performed to etch the third material layer 414 to form an opening 420. The opening 420 exposes portion of the second material layer 412. The pattern of the patterned photoresist layer is transferred to the third material layer 414.

Figure 4D:
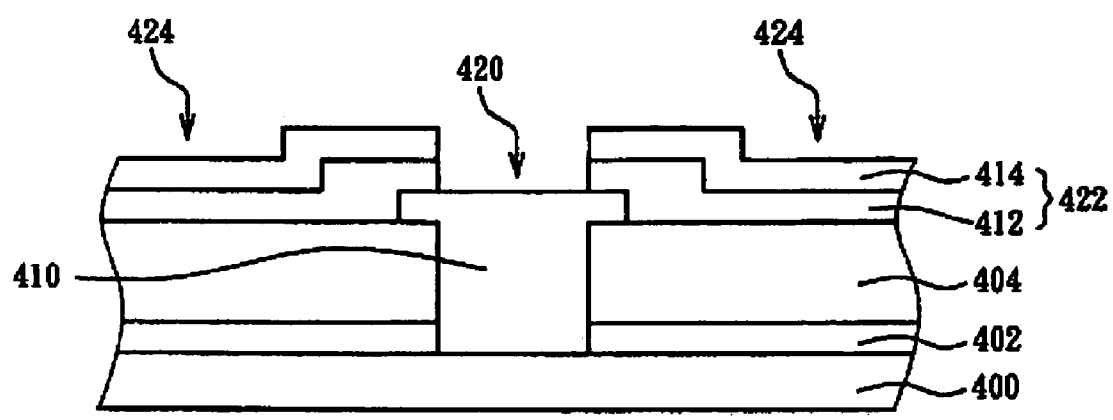

Reference is made to FIG. 4D. The patterned photoresist layer 416 illustrated in FIG. 4C is removed. The third material layer 414 is used as an etching mask and an etching process is performed to etch the exposed second material layer 412 to define a second electrode 422. Finally, a release etch process is performed to remove the sacrificial layer 404 illustrated in FIG. 4C and an optical interference display unit 424 is formed.

Because the material used to form the support structure comprises positive photoresist, negative photoresist, and polymer, such as, for example, acrylic resin and epoxy resin, the material is damaged or removed in the process performed to remove the photoresist layer 416 if the second material layer is absent. Because the support structure is damaged or removed, the edge of the second electrode gets no support and sags. The length of the cavity is not uniform because of the sagging edge of the electrode and the wavelength of the reflective light is thus not uniform; therefore, the resolution of the optical interference display plate becomes worse. However, the present invention discloses a method for fabricating an optical interference display unit, in which a material layer is formed on the support structure to protect the support structure and avoid damaging the support structure during the photoresist layer stripping process. Furthermore, the material for forming the second material layer 412 and the third material layer 414 also can be metal/dielectric or dielectric/metal, such as aluminum/silicon nitride or silicon nitride/aluminum.

Although the present invention has been described in considerable detail with reference certain preferred embodiments thereof, other embodiments are possible. Therefore, their spirit and scope of the appended claims should no be limited to the description of the preferred embodiments container herein. In view of the foregoing, it is intended that the present invention cover modifications and variations of this invention provided they fall within the scope of the following claims and their equivalents.

What is claimed is:

1. A method for fabricating an optical interference display unit disposed on a transparent substrate, the method comprising:

forming a first electrode on the transparent substrate;
forming a support structure;
forming a first material layer over the support structure;
forming a second material layer over the first material layer;
forming a patterned photoresist layer over the second material layer;
using the patterned photoresist layer as a mask to etch the second material layer to expose the first material layer;
stripping the patterned photoresist layer, using the first material layer to protect the support structure; and
using the second material layer as a mask to etch the first material layer to expose the support structure, wherein the first material and the second material layers form a second electrode of the optical interference display unit, and the second electrode is a movable electrode, an edge of the second electrode supported by the support structure.

2. The method for fabricating the optical interference display unit of claim 1, wherein the second electrode is a deformable electrode.

3. The method for fabricating the optical interference display unit of claim 1, wherein the first material layer is made from a conductive material and the second material layer is made from a metal or a dielectric material.

4. The method for fabricating the optical interference display unit of claim 1, wherein the first material layer is made from a metal or a dielectric material and the second material layer is made from a conductive material.

5. The method for fabricating the optical interference display unit of claim 1, wherein a material for forming the first material layer is aluminum, chromium, cobalt, copper, silicon nitride or silicon oxide.

6. The method for fabricating the optical interference display unit of claim 1, wherein a material for forming the second material layer is aluminum, chromium, cobalt, copper, silicon nitride or silicon oxide.

7. The method for fabricating the optical interference display unit of claim 1, wherein a material for forming the second material layer has a higher etching selectivity ratio than that of a material for forming the first material layer.

8. The method for fabricating the optical interference display unit of claim 1, wherein at least two openings are formed in the sacrificial layer and the first electrode; and wherein a support structure is formed in each opening.

9. The method for fabricating the optical interference display unit of claim 1, further comprising forming a sacrificial layer on the first electrode and forming an opening in the sacrificial layer and the first electrode.

10. The method for fabricating the optical interference display unit of claim 9, further comprising removing the sacrificial layer to create an optical cavity between the first electrode and the second electrode.

11. The method for fabricating the optical interference display unit of claim 1, wherein the second material layer comprises a metal material.

12. The method for fabricating the optical interference display unit of claim 1, wherein the second material layer comprises a dielectric material.

13. The method for fabricating the optical interference display unit of claim 1, wherein the first material layer comprises a metal material.

14. The method for fabricating the optical interference display unit of claim 1, wherein the first material layer comprises a dielectric material.

15. The method for fabricating the optical interference display unit of claim 1, wherein the first material layer comprises aluminum and the second material layer comprises chromium.

16. The method for fabricating the optical interference display unit of claim 1, wherein the first material layer comprises chromium and the second material layer comprises aluminum.

17. The method for fabricating the optical interference display unit of claim 1, wherein the first material layer comprises aluminum and the second material layer comprises silicon nitride.

18. The method for fabricating the optical interference display unit of claim 1, wherein the first material layer comprises silicon nitride and the second material layer comprises aluminum.

19. The method for fabricating the optical interference display unit of claim 1, wherein the step of stripping the patterned photoresist layer does not remove the support structure.

* * * * *

UNITED STATES PATENT AND TRADEMARK OFFICE
CERTIFICATE OF CORRECTION

| | |
|---|---|
| PATENT NO. | : 7,485,236 B2 |
| APPLICATION NO. | : 11/221806 |
| DATED | : February 3, 2009 |
| INVENTOR(S) | : Wen-Jian Lin |

It is certified that error appears in the above-identified patent and that said Letters Patent is hereby corrected as shown below:

Title page, Item 73, Line 2, delete "San Digeo", and please insert --San Diego,--, therefor.

Title page page 2, Item [56], Column 2, Line 8, under Other Publications, delete "Aluminoa", and please insert --Alumina--, therefor.

Title page page 2, Item [56], Column 2, Line 9, under Other Publications, delete "onglass", and please insert --on glass--, therefor.

Title page page 2, Item [56], Column 2, Line 16, under Other Publications, delete "compatable", and please insert --compatible--, therefor.

Title page page 2, Item [56], Column 2, Line 20, under Other Publications, delete "vo", and please insert --vol.--, therefor.

Title page page 2, Item [56], Column 2, Line 22, under Other Publications, delete "maniature", and please insert --miniature--, therefor.

Title page page 2, Item [56], Column 2, Line 25, under Other Publications, delete "Internatioal", and please insert --International--, therefor.

Title page page 2, Item [56], Column 2, Line 25, under Other Publications, delete "Andactuators", and please insert --And Actuators--, therefor.

Title page page 2, Item [56], Column 2, Line 26, under Other Publications, delete "Youk", and please insert --York--, therefor.

Title page page 2, Item [56], Column 2, Line 57, under Other Publications, delete "microelectomechanical systesm" and please insert --microelectromechanical systems--, therefor.

Title page page 2, Item [56], Column 2, Line 58, under Other Publications, delete "Comparision", and please insert --Comparison--, therefor.

Signed and Sealed this

Fifteenth Day of June, 2010

David J. Kappos
*Director of the United States Patent and Trademark Office*